US012672600B2

(12) United States Patent

Allgaier et al.

(10) Patent No.: US 12,672,600 B2

(45) Date of Patent: Jul. 7, 2026

(54) SYSTEMS AND METHODS FOR DETERMINING STATE DATA FOR AGRICULTURAL PARAMETERS AND PROVIDING SPATIAL STATE MAPS

(71) Applicant: Precision Planting LLC, Tremont, IL (US)

(72) Inventors: Ryan Allgaier, East Peoria, IL (US); David Aaron Wilcoxson, Tremont, IL (US); Emil Bandy, Pekin, IL (US)

(73) Assignee: Precision Planting LLC, Tremont, IL (US)

( * ) Notice: Subject to any disclaimer, the term of this patent is extended or adjusted under 35 U.S.C. 154(b) by 305 days.

(21) Appl. No.: 18/546,331

(22) PCT Filed: Jan. 28, 2022

(86) PCT No.: PCT/IB2022/050760

§ 371 (c)(1),
(2) Date: Aug. 14, 2023

(87) PCT Pub. No.: WO2022/200869

PCT Pub. Date: Sep. 29, 2022

(65) Prior Publication Data

US 2024/0130270 A1  Apr. 25, 2024
US 2024/0224839 A9  Jul. 11, 2024

Related U.S. Application Data

(60) Provisional application No. 63/165,364, filed on Mar. 24, 2021.

(51) Int. Cl.
*A01C 21/00* (2006.01)
*A01B 79/00* (2006.01)

(52) U.S. Cl.
CPC .......... *A01C 21/005* (2013.01); *A01B 79/005* (2013.01)

(58) Field of Classification Search
CPC ........................... A01C 21/005; A01B 79/005
(Continued)

(56) References Cited

U.S. PATENT DOCUMENTS 5,323,721 A * 6/1994 Tofte ...................... A01C 7/102
221/9
5,956,255 A 9/1999 Flamme
(Continued)

FOREIGN PATENT DOCUMENTS

WO        2022200869 A1    9/2022

OTHER PUBLICATIONS

European Patent Office, Search Report for related PCT Application No. PCT/IB2022/050760, dated Apr. 25, 2022, 13 pages.

*Primary Examiner* — Kambiz Abdi

(57) ABSTRACT

Described herein are systems and methods for determining state data for agricultural parameters during agricultural applications and providing spatial state maps. In one embodiment, a computer implemented method comprises obtaining as applied data of an agricultural implement as the agricultural implement passes through a field for an agricultural application. The computer implement method also includes processing the as applied data to calculate data for a parameter of the agricultural application and determining state data (e.g., quality indicator state) for each row unit based on the data for the parameter and at least one of default configuration settings or user configuration settings for the quality indicator state.

9 Claims, 8 Drawing Sheets

(58) Field of Classification Search
USPC ......................................................... 111/200
See application file for complete search history.

(56) References Cited

U.S. PATENT DOCUMENTS

| 6,070,539 | A | 6/2000 | Flamme et al. | |
| 6,389,999 | B1 | 5/2002 | Duello | |
| 8,561,472 | B2 | 10/2013 | Sauder et al. | |
| 10,515,425 | B2 * | 12/2019 | Koch | A01D 41/1273 |
| 2019/0246552 | A1 | 8/2019 | Sauder et al. | |
| 2020/0404832 | A1 * | 12/2020 | Schoeny | A01C 7/06 |
| 2021/0068338 | A1 * | 3/2021 | Stoller | A01C 23/007 |
| 2021/0298233 | A1 * | 9/2021 | Palla | A01M 7/0089 |
| 2024/0130270 | A1 * | 4/2024 | Allgaier | A01B 79/005 |
| 2024/0278202 | A1 * | 8/2024 | Bump | B01F 35/2206 |

* cited by examiner

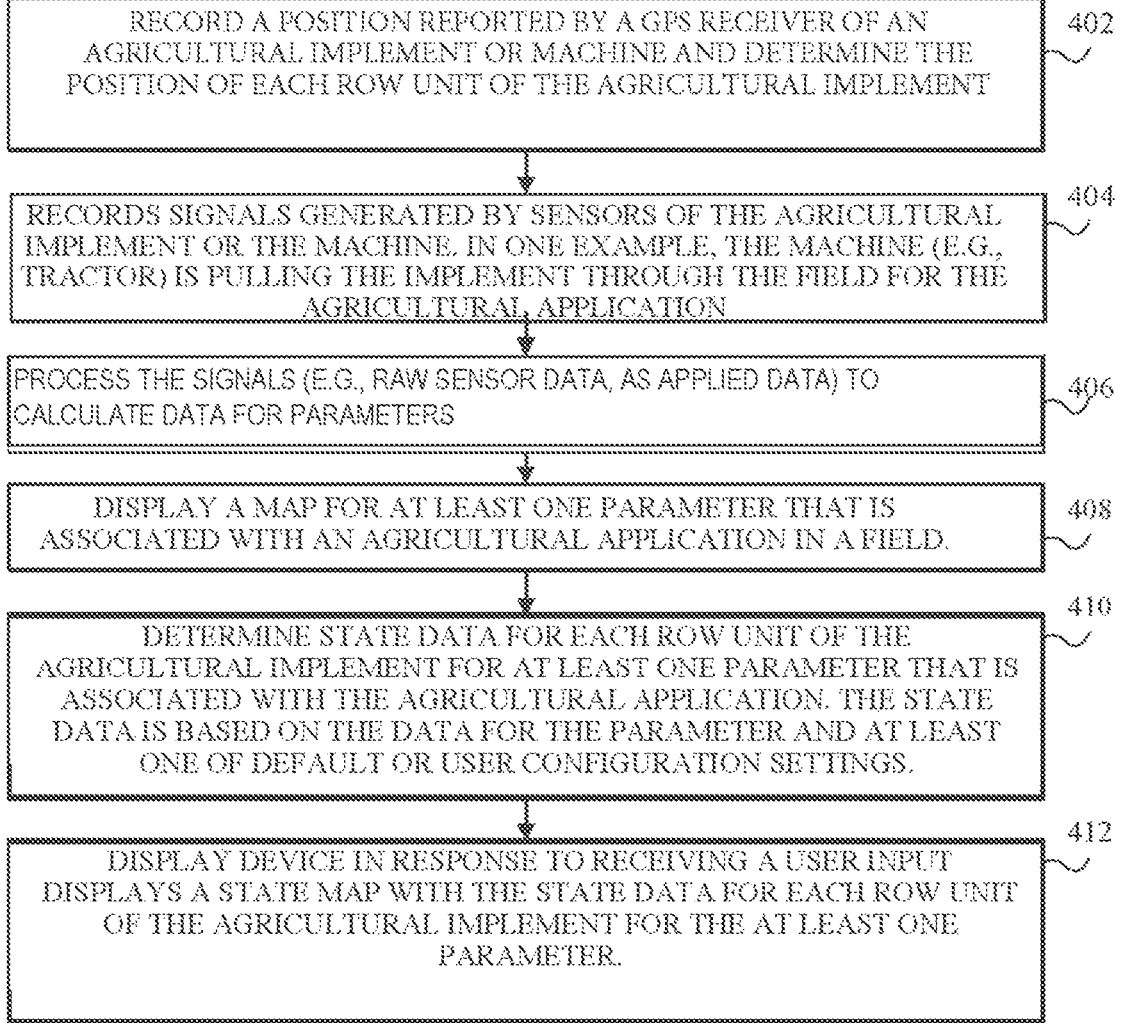

RECORD A POSITION REPORTED BY A GPS RECEIVER OF AN AGRICULTURAL IMPLEMENT OR MACHINE AND DETERMINE THE POSITION OF EACH ROW UNIT OF THE AGRICULTURAL IMPLEMENT — 402

RECORDS SIGNALS GENERATED BY SENSORS OF THE AGRICULTURAL IMPLEMENT OR THE MACHINE. IN ONE EXAMPLE, THE MACHINE (E.G., TRACTOR) IS PULLING THE IMPLEMENT THROUGH THE FIELD FOR THE AGRICULTURAL APPLICATION — 404

PROCESS THE SIGNALS (E.G., RAW SENSOR DATA, AS APPLIED DATA) TO CALCULATE DATA FOR PARAMETERS — 406

DISPLAY A MAP FOR AT LEAST ONE PARAMETER THAT IS ASSOCIATED WITH AN AGRICULTURAL APPLICATION IN A FIELD. — 408

DETERMINE STATE DATA FOR EACH ROW UNIT OF THE AGRICULTURAL IMPLEMENT FOR AT LEAST ONE PARAMETER THAT IS ASSOCIATED WITH THE AGRICULTURAL APPLICATION. THE STATE DATA IS BASED ON THE DATA FOR THE PARAMETER AND AT LEAST ONE OF DEFAULT OR USER CONFIGURATION SETTINGS. — 410

DISPLAY DEVICE IN RESPONSE TO RECEIVING A USER INPUT DISPLAYS A STATE MAP WITH THE STATE DATA FOR EACH ROW UNIT OF THE AGRICULTURAL IMPLEMENT FOR THE AT LEAST ONE PARAMETER. — 412

FIG. 4

SYSTEMS AND METHODS FOR DETERMINING STATE DATA FOR AGRICULTURAL PARAMETERS AND PROVIDING SPATIAL STATE MAPS

CROSS-REFERENCE TO RELATED APPLICATIONS

This application is a national phase entry under 35 U.S.C. § 371 of International Patent Application PCT/IB2022/050760, filed Jan. 28, 2022, designating the United States of America and published in English as International Patent Publication WO 2022/200869 A1 on Sep. 29, 2022, which claims priority to U.S. Application No. 63/165,364, filed 24 Mar. 2021, the contents of which is incorporated herein by reference in its entirety.

TECHNICAL FIELD

Embodiments of the present disclosure relate to systems and methods for determining state data for agricultural parameters during agricultural applications and providing spatial state maps.

BACKGROUND

Agricultural implements are used for providing an agricultural application (e.g., corn seed, soybean seed, fertilizer, herbicide) for crops in a field. Some planters include a display monitor within a cab for displaying a coverage map that shows regions of the field that have been planted. The coverage map of the planter is generated based on planting data collected by the planter. An operator needs planting data in real time to improve planting operations for spatial variations in planting. The planting data can present a challenge to review, understand, and appropriately modify an appropriate planting parameter in real time during the planting operation.

SUMMARY

Described herein are systems and methods for determining state data for agricultural parameters during agricultural applications and providing spatial state maps. In one embodiment, a computer implemented method comprises obtaining as applied data of an agricultural implement as the agricultural implement passes through a field for an agricultural application. The computer implement method also includes processing the as applied data to calculate data for a parameter of the agricultural application and determining state data (e.g., quality indicator state) for each row unit based on the data for the parameter and at least one of default configuration settings or user configuration settings for the quality indicator state.

Other embodiments are also described. Other features of embodiments of the present invention will be apparent from the accompanying drawings and from the detailed description which follows.

BRIEF DESCRIPTION OF THE DRAWINGS

The present disclosure is illustrated by way of example, and not by way of limitation, in the figures of the accompanying drawings and in which:

FIG. 4 illustrates a flow diagram of one embodiment for a method 400 of generating state data (e.g., alert and alarm state data) and displaying state maps (e.g., alert and alarm maps) for agricultural applications;

DETAILED DESCRIPTION

All references cited herein are incorporated herein in their entireties. If there is a conflict between a definition herein and in an incorporated reference, the definition herein shall control.

Described herein are systems and methods for determining state data for agricultural parameters during agricultural applications and providing spatial state maps based on the state data. In one embodiment, a computer implemented method comprises obtaining as applied data of an agricultural implement as the agricultural implement passes through a field for an agricultural application. The computer implement method also includes processing the as applied data to calculate data for parameters of the agricultural application and determining state data (e.g., quality indicator state) for each row unit based on the data for at least one parameter and at least one of default configuration settings or user configuration settings for the quality indicator state.

The state data and state maps allow an operator of the agricultural implement to quickly determine in real time during the agricultural application whether a row unit has any alert, alarm, or failure state and to be able to respond in real time with an appropriate corrective action if necessary for any of the row units of the agricultural implement.

In the following description, numerous details are set forth. It will be apparent, however, to one skilled in the art, that embodiments of the present disclosure may be practiced without these specific details. In some instances, well-known structures and devices are shown in block diagram form, rather than in detail, in order to avoid obscuring the present disclosure.

Figure 1:
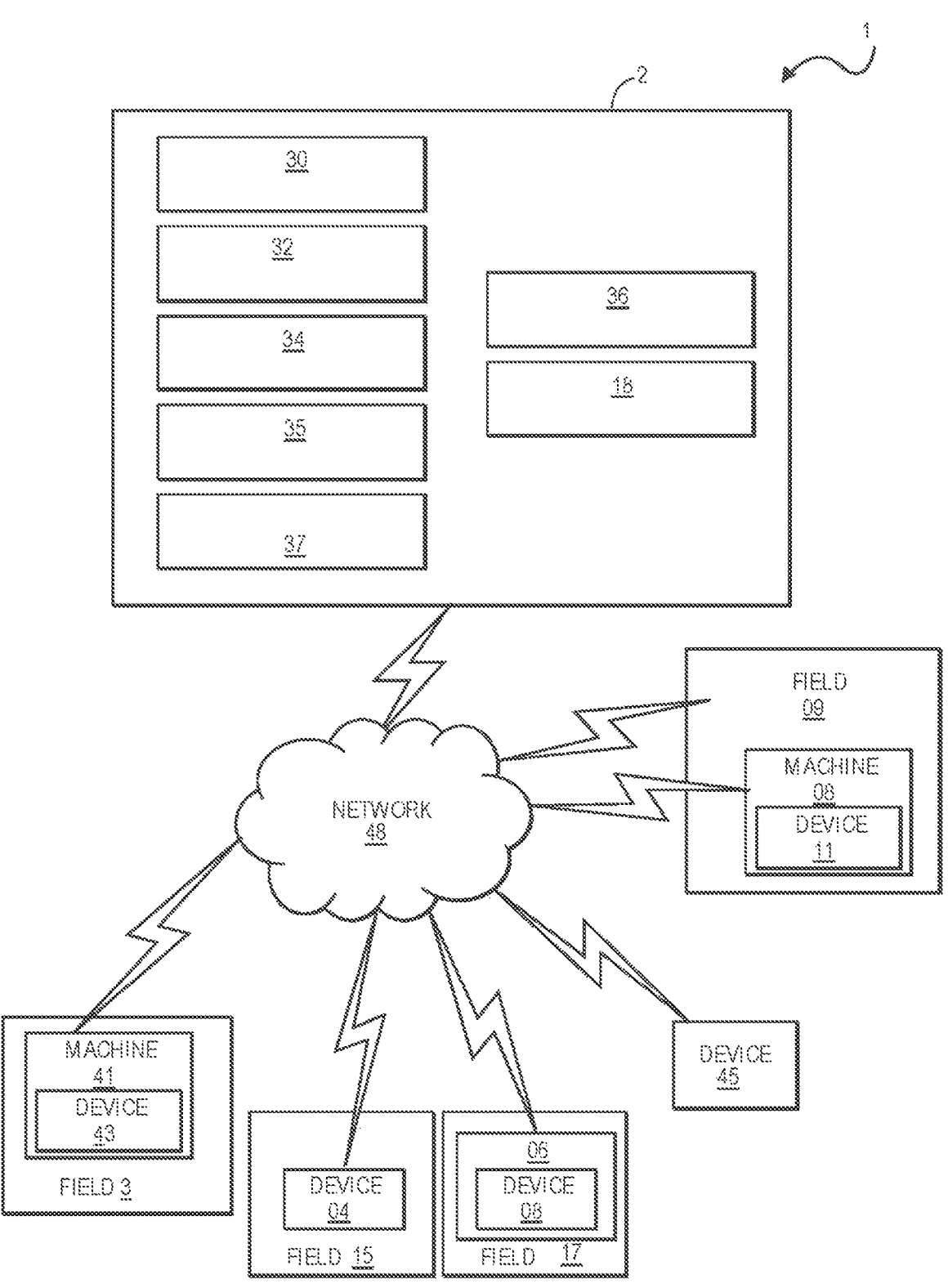
FIG. 1 shows an example of a system for collecting data of agricultural fields and performing analysis of the data of agricultural fields in accordance with one embodiment.

FIG. 1 shows an example of a system for collecting and analyzing agricultural data from agricultural fields in order to monitor agricultural applications, generate spatial state data, and display customized spatial state maps in accordance with one embodiment. As applied data includes raw as applied data obtained from sensors of an agricultural implement or machine as the agricultural implement traverses a field.

For example, and in one embodiment, the system 1 may be implemented as a cloud based system with servers, data processing devices, computers, etc. Aspects, features, and functionality of the system 1 can be implemented in servers, planters, planter monitors, combines, laptops, tablets, computer terminals, client devices, user devices, handheld computers, personal digital assistants, cellular telephones, cameras, smart phones, mobile phones, computing devices, or a combination of any of these or other data processing devices.

In other embodiments, the system includes a network computer or an embedded processing device within another device (e.g., display device) or within a machine (e.g., planter, combine), or other types of data processing systems having fewer components or perhaps more components than that shown in FIG. 1. While illustrated with a monitor as the display device, the display device can by any display device, such as a monitor, a smartphone, a tablet, a personal computer, or any touch activated screen.

The system 1 (e.g., cloud based system) for collecting and analyzing agricultural data includes machines 41, 06, and 08 for performing field operations (e.g., tillage, planting, fertilization, harvesting, etc). The machines can include devices (e.g., devices 43, 08, 11) in addition to other devices 04 and 45 (e.g., user devices, mobile device, tablet devices, drones, etc) for displaying customized agricultural data including state maps (e.g., alert and alarm maps) to inform an operator in real time during the agricultural application if operations are occurring properly or need to be adjusted during the agricultural application. The machines may also include sensors for capturing data of crops and soil conditions within associated fields (e.g., fields 3, 15, 17, 9). The system 1 includes an agricultural analysis system 2 and a storage medium 36 to store instructions, software, software programs, etc. for execution by the processing system 32 and for performing operations of the agricultural analysis system 2. A data analytics module 30 may perform analytics on agricultural data (e.g., images, field, yield, etc.) to generate crop predictions relating to agricultural operations. For example, the crop predictions may predict yield (e.g., crop yield) based on development of crops (e.g., yield potential or ear potential for corn) at different growth stages.

A field information database 34 stores agricultural data (e.g., crop growth stage, soil types, soil characteristics, moisture holding capacity, etc.) for the fields that are being monitored by the system 1. An agricultural practices information database 35 stores farm practices information (e.g., as-applied planting information, fertilization information, planting population, applied nutrients (e.g., nitrogen), yield levels, proprietary indices (e.g., ratio of seed population to a soil parameter), etc.) for the fields that are being monitored by the system 1. A cost/price database 37 stores input cost information (e.g., cost of seed, cost of nutrients (e.g., nitrogen)) and commodity price information (e.g., revenue from crop).

The system 1 shown in FIG. 1 may include a network interface 18 for communicating with other systems or devices such as drone devices, user devices, and machines (e.g., planters, combines) via a network 48 (e.g., Internet, wide area network, WiMax, satellite, cellular, IP network, etc.). The network interface includes one or more types of transceivers for communicating via the network 48.

The processing system 32 may include one or more microprocessors, processors, a system on a chip (integrated circuit), or one or more microcontrollers. The processing system includes processing logic for executing software instructions of one or more programs. The system 1 includes the storage medium 36 for storing data and programs for execution by the processing system. The storage medium 36 can store, for example, software components such as a software application for capturing images and performing analysis of the capturing images or any other software application. The storage medium 36 can be any known form of a machine readable non-transitory storage medium, such as semiconductor memory (e.g., flash; SRAM; DRAM; etc.) or non-volatile memory, such as hard disks or solid-state drive.

While the storage medium (e.g., machine-accessible non-transitory medium) is shown in an exemplary embodiment to be a single medium, the term "machine-accessible non-transitory medium" should be taken to include a single medium or multiple media (e.g., a centralized or distributed database, and/or associated caches and servers) that store the one or more sets of instructions. The term "machine-accessible non-transitory medium" shall also be taken to include any medium that is capable of storing, encoding or carrying a set of instructions for execution by the machine and that cause the machine to perform any one or more of the methodologies of the present disclosure. The term "machine-accessible non-transitory medium" shall accordingly be taken to include, but not be limited to, solid-state memories, optical and magnetic media, and carrier wave signals.

Figure 2:
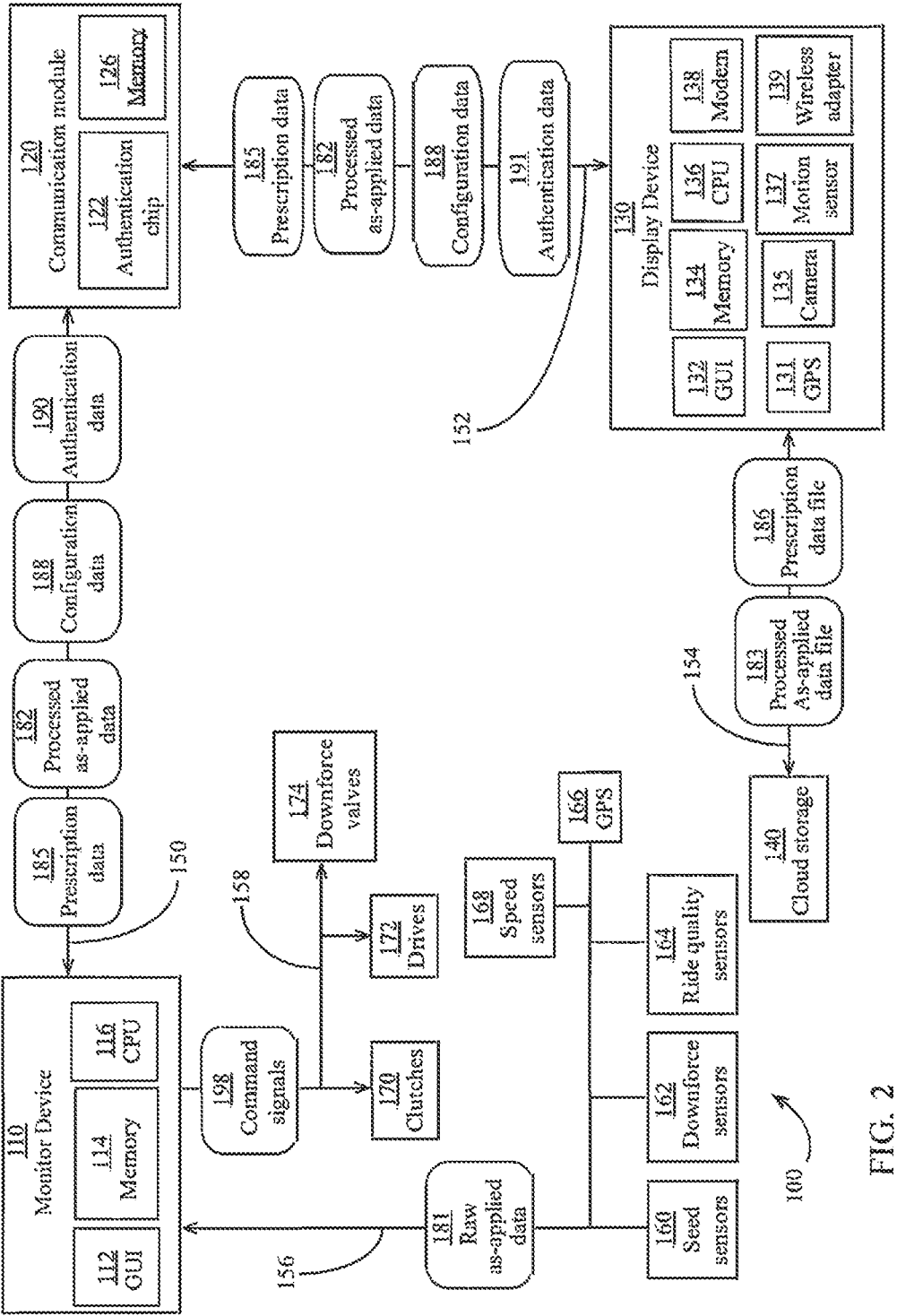
FIG. 2 schematically illustrates an embodiment of monitor system and data transmission between components of the monitor System.

FIG. 2 illustrates an embodiment of a monitor system 100. The monitor system 100 preferably includes a monitor device 110, a communication module 120, and a display device 130. The monitor device 110 preferably includes a graphical user interface (GUI) 112, memory 114, and a central processing unit (CPU) 116. The monitor device 110 is in electrical communication with the communication module 120 via a harness 150. The communication module 120 preferably includes an authentication chip 122 and memory 126. The communication module 120 is in electrical communication with the display device 130 via a harness 152. The display device 130 preferably includes a GUI 132, memory 134, a CPU 136 and a wireless Internet connection means 154 for connecting to a "cloud" based storage server 140 (or system 1). One such wireless Internet connection means 154 may comprise a cellular modem 138. Alternatively, the wireless Internet connection means 154 may comprise a wireless adapter 139 for establishing an Internet connection via a wireless router.

The display device 130 may be a consumer computing device or other multi-function computing device. The display device 130 preferably includes general purpose software including an Internet browser. The display device 130 also preferably includes a motion sensor 137, such as a gyroscope or accelerometer, and preferably uses a signal generated by the motion sensor 137 to determine a desired modification of the GUI 132. The display device 130 also preferably includes a digital camera 135 whereby pictures taken with the camera 135 may be associated with a global positioning system (GPS) position, stored in the memory 134 and transferred to the cloud storage server 140. The display device 130 also preferably includes a GPS receiver 131.

The monitor device 110 is preferably in electrical communication with seed sensors 160, downforce sensors 162, ride quality sensors 164, a GPS receiver 166, and one or more speed sensors 168 via a harness 156. The monitor device 110 is preferably in electrical communication with clutches 170, drives 172, and downforce valves 174 via a harness 158.

As the planter 10 is drawn through the field, the monitor device 110 sends command signals 198 to the clutches 170, drives 172 and downforce valves 174. Command signals 198 preferably include signals determining whether one or more clutches 170 are engaged, signals determining the rate at which drives 172 are driven, and signals determining the downforce set by downforce valves 174. As the planter 10 is drawn through the field, the monitor device 110 receives raw as-applied data 181 including signals from seed sensors 160, downforce sensors 162, ride quality sensors 164, GPS receiver 166 and seed sensors 168. The monitor device 110 preferably processes the raw as-applied data 181, and stores the as-applied data to the memory 114. The monitor 130 preferably transmits processed as-applied data 182 to the display device 130 via the communication module 120. The processed as-applied data 182 is preferably streaming, piecewise, or partial data.

Implement control and data storage are performed by the monitor device 110 such that if the display device 130 stops functioning, is removed from the monitor system 100, or is used for other functions, the implement operations and essential data storage are not interrupted. The display device 130 receives and stores the live processed as-applied data 182 in the memory 134. The display device 130 preferably renders a map of the processed as-applied data 182 (e.g., a population map). The map preferably includes a set of application map images Superimposed on an aerial image. The display device 130 preferably displays a numerical aggregation of as-applied data (e.g., population planted by a row unit over the last 5 seconds). The display device 130 preferably stores the location, size and other display characteristics of the application map images rendered in the memory 134. After completing planting operations, the display device 130 preferably transmits processed as-applied data file 183 to the cloud storage server 140. Processed as-applied data file 183 is preferably a complete file (e.g., a data file). The monitor device 110 preferably stores completed as-applied data (e.g., in a data file) in the memory 114. Data can be communicated between the monitor device 110, communication module 120, and display device 130 including prescription data 185, as applied data 182, configuration data 182, authentication data 190, 191. As applied data file 182 and prescription data file 186 can be communicated between cloud storage 140 and display device 130.

Figure 3A:
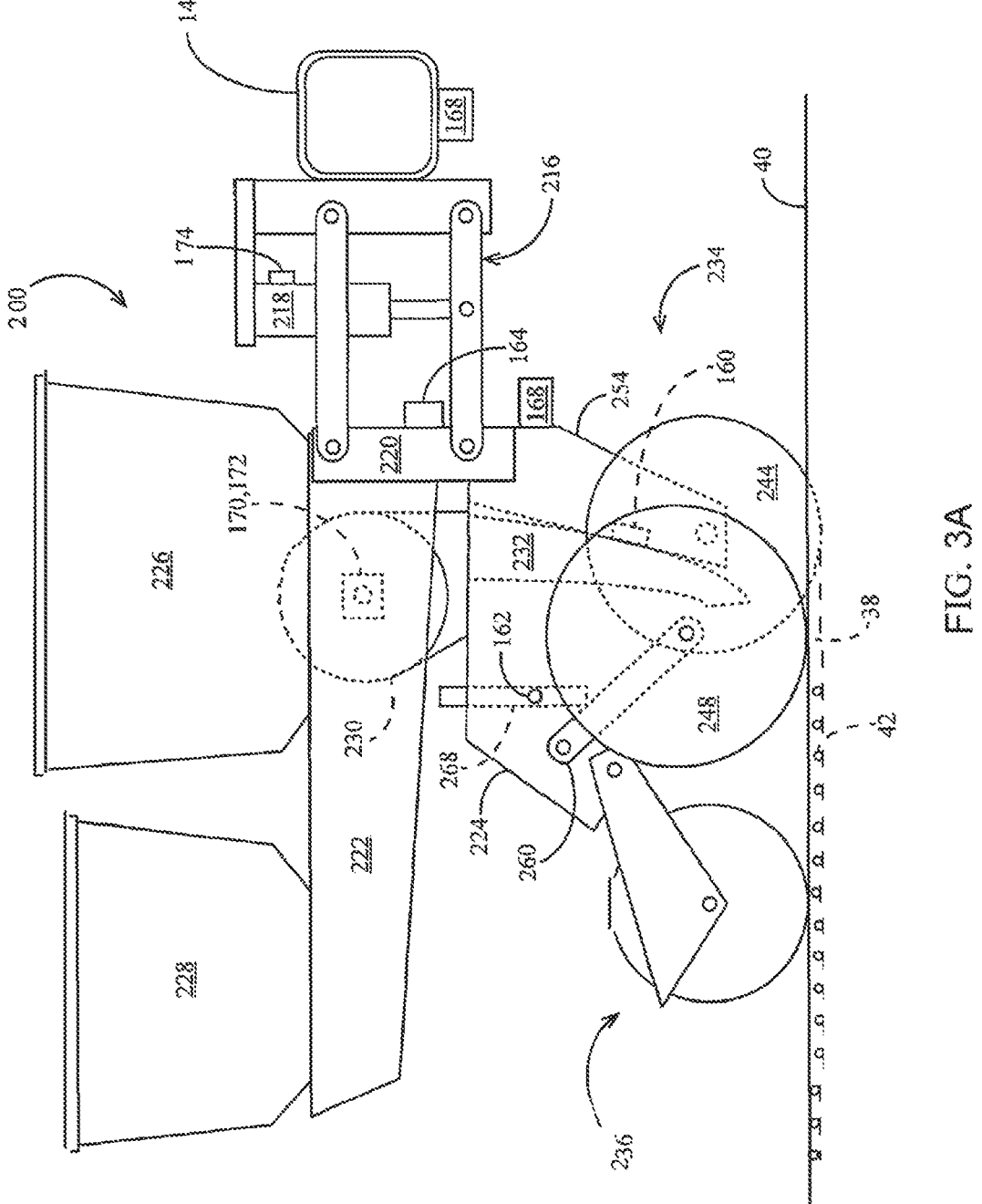
FIG. 3A is a side elevation view of an embodiment of a row unit with components of the monitor system of FIG. 2.
Figure 3B:
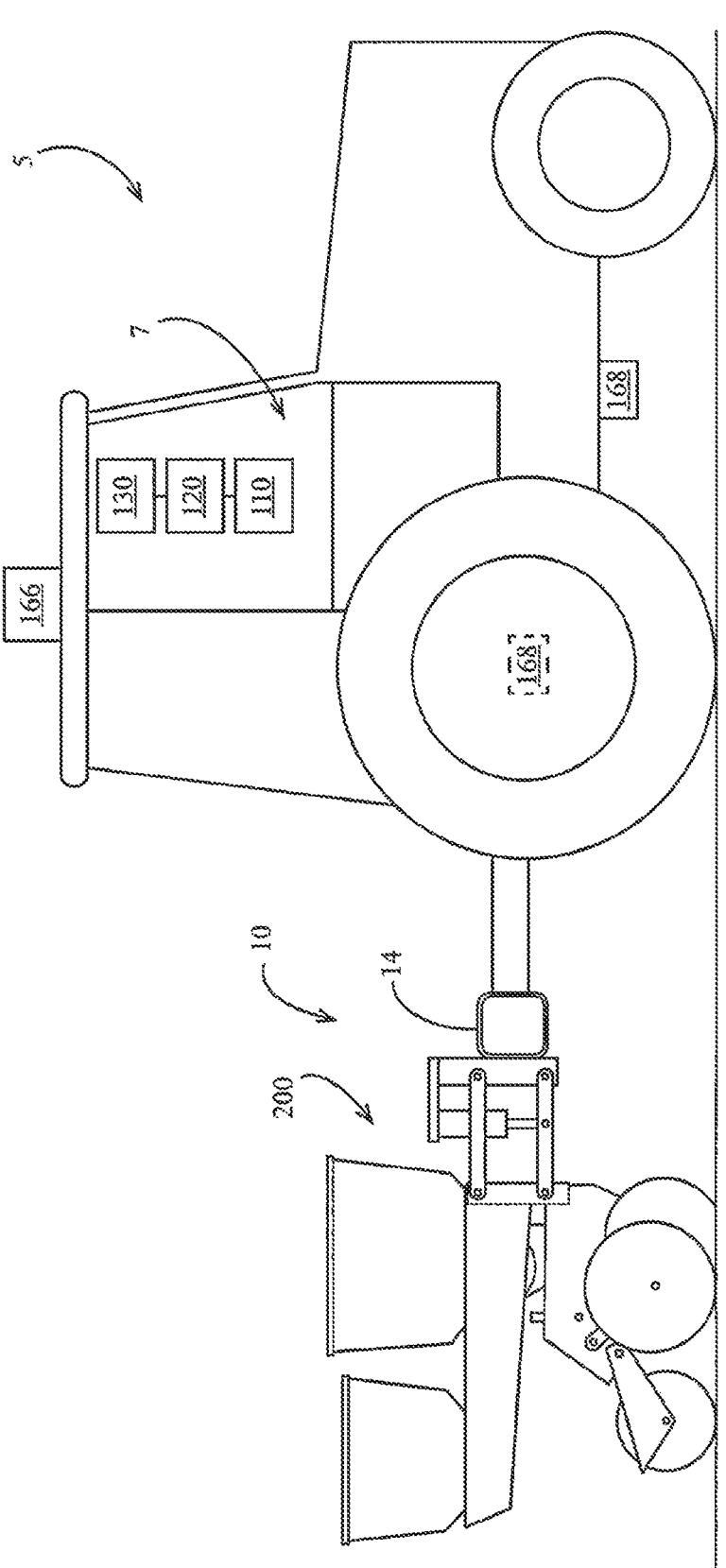
FIG. 3B is a side elevation view of a tractor and planter with the row unit of FIG. 3A and other components of the monitor system of FIG. 2.

Turning to FIGS. 3A and 3B, an embodiment of the monitor system 100 is illustrated integrated on a planter 10 drawn by a tractor 5. The planter 10 includes a transversely extending toolbar 14 to which multiple row units 200 are mounted.

Referring to FIG. 3A, each row unit 200 is supported from the toolbar 14 by a parallel linkage 216 which permits each row unit to move vertically independently of the toolbar and the other spaced row units in order to accommodate changes in terrain or upon the row unit encountering a rock or other obstruction as the planter is drawn through the field. The ride quality sensor 164, preferably an accelerometer, is mounted to the row unit 200 and disposed to measure the vertical velocity and acceleration of the row unit 200. Speed sensors 168, such as radar speed sensors or GPS speed sensors, are preferably mounted to the toolbar 14 or to the row unit 200. A downforce actuator 218, such as an air bag, hydraulic or pneumatic cylinder or the like, acts on the parallel linkage 16 to exert a downforce on the row unit. The downforce valve 174, such as an electrically operated servo valve, controls the amount of downforce applied by the down force actuator 218. Each row unit 200 further includes a front mounting bracket 220 to which is mounted a hopper support beam 222 and a subframe 224. The hopper support beam 222 supports a seed hopper 226 and a fertilizer hopper 228 as well as operably supporting a seed meter 230 and a seed tube 232. The subframe 224 operably supports a furrow opening assembly 234 and a furrow closing assembly 236. In operation of the planter 10, the furrow opening assembly 234 of the row unit 200 cuts a furrow 38 into the soil surface 40 as the planter 10 is drawn through the field. The seed hopper 226, which holds the seeds to be planted, communicates a constant supply of seeds 42 to the seed meter 230. In some embodiments the planter 10 is a central-fill planter including a frame-mounted bulk hopper as is known in the art. In such embodiments the seed hopper 226 preferably comprises a small auxiliary hopper in seed communication with the bulk hopper. The seed meter 230 of each row unit 200 is preferably selectively engaged to the drive 172 via the clutch 170 such that individual seeds 42 are metered and discharged into the seed tube 232 at regularly spaced intervals based on the seed population desired and the speed at which the planter is drawn through the field. In other embodiments, the clutch 170 is omitted and the drives 172 comprise electric drives such as those disclosed in Applicant's International Patent Publication No. WO/2014/018717. The seed sensor 160, preferably an optical sensor, is supported by the seed tube 232 and disposed to detect the presence of seeds 42 as they pass. The seed 42 drops from the end of the seed tube 232 into the furrow 38 and the seeds 42 are covered with soil by the closing wheel assembly 236. The furrow opening assembly 234 preferably includes a pair of furrow opening disk blades 244 and a pair of gauge wheels 248 selectively vertically adjustable relative to the disk blades 244 by a depth adjusting mechanism 268. The depth adjusting mechanism 268 preferably pivots about the downforce sensor 162, which preferably comprises a pin instrumented with strain gauges for measuring the force exerted on the gauge wheels 248 by the soil 40. The down force sensor 162 is preferably of the type disclosed in U.S. Pat. No. 8,561,472. In other embodiments, the downforce sensor is of the types disclosed in U.S. Pat. No. 6,389,999. The disk blades 244 are rotatably supported on a shank 254 depending from the subframe 224. Gauge wheel arms 260 pivotally support the gauge wheels 248 from the subframe 224. The gauge wheels 248 are rotatably mounted to the forwardly extending gauge wheel arms 260. Referring to FIG. 3B, the GPS receiver 166 is preferably mounted to an upper portion of the tractor 5. The display device 130, communication module 120, and monitor device 110 are mounted in a cab 7 of the tractor 5. One or more speed sensors 168, such as a hall-effect wheel speed sensor or a radar speed sensor, are preferably mounted to the tractor 5.

FIG. 4 illustrates a flow diagram of one embodiment for a computer implemented method 400 of generating state data (e.g., alert and alarm state data) and displaying alert and alarm maps for agricultural applications based on the state data. The method 400 is performed by processing logic that may comprise hardware (circuitry, dedicated logic, etc.), software (such as is run on a general purpose computer system or a dedicated machine or a device), or a combination of both. In one embodiment, the method 400 is performed by processing logic of at least one data processing system (e.g., processing system 32, machine, apparatus, monitor, monitor device, display device, user device, self-guided device, self-propelled device, etc.). The data processing system executes instructions of a software application or program with processing logic. The software application or program can be initiated by the data processing system. In one example, a monitor or display device receives as applied agricultural data and provides a customized display for operations of the method 400.

At operation 402, the method records a position reported by a GPS receiver of an agricultural implement or machine and determines the position of each row unit of the agricultural implement.

At operation 404, the method records signals (e.g., raw sensor data, as applied data) generated by sensors of the agricultural implement or the machine. In one example, the machine (e.g., tractor) is pulling the implement through the field for the agricultural application. At operation 406, the method processes the signals (e.g., raw sensor data, as applied data) to calculate data for parameters (e.g., seed population data, singulation data, SRI, coverage data, insecticide data, vehicle/machine speed, row speed, down force, applied down force, seeding tank, liquid flow (volume/acre), granular rate (mass/acre), spacing data for planting seeds, ride quality data, closing margin, closing act. pressure) for the agricultural application.

Figure 5:
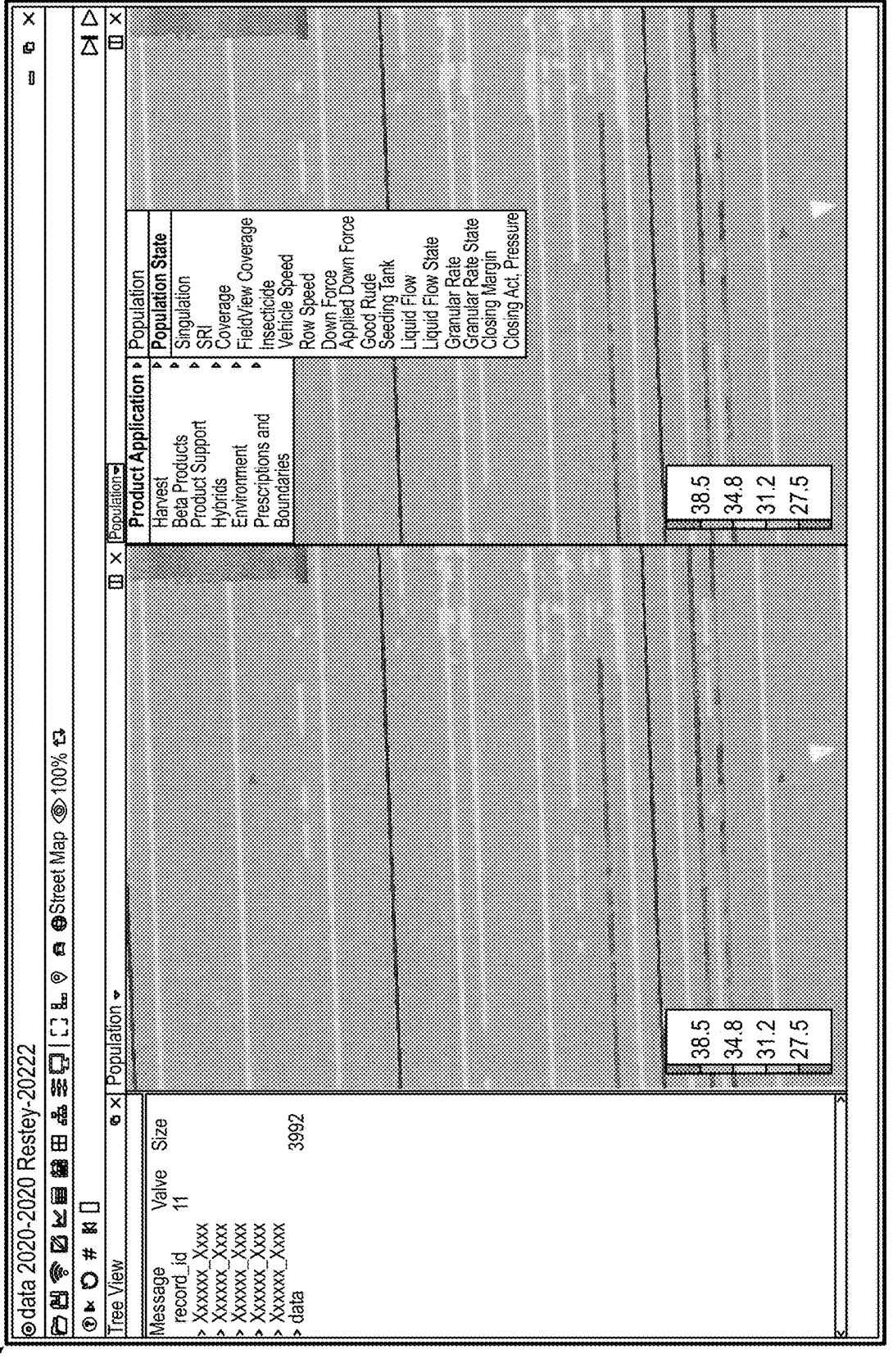
FIG. 5 illustrates a user interface 501 with a population map and selectable options to select a state for a parameter in accordance with one embodiment.

At operation 408, a display device displays a map for at least one parameter that is associated with an agricultural application in a field. The map shows the data for the at least one parameter as the agricultural implement passes through a field. In one example, the map shows seed population data as illustrated in FIG. 5 for an agricultural implement.

At operation 410, the method determines state data for each row unit of an agricultural implement for at least one parameter that is associated with the agricultural application. The state data is determined based on the data for the parameter and at least one of default configuration settings or user configuration settings.

In one example, the method determines a seed population state for each row unit for a planting operation. If the seed population per unit area for a row unit is below (or above) a threshold (e.g., first number of seeds below (or above) a threshold, first percentage (%) below (or above) a threshold), then an alert state is generated for the row unit. If the seed population per unit area for a row unit is significantly below (or above) a threshold (e.g., second number of seeds below (or above) a threshold, second % below (or above) a threshold), then an alarm or failure state is generated for the row unit. The threshold can be a desired target for the parameter. Default configuration settings or user configuration settings can determine the first and second number of seeds and also the first and second percentage below (or above) the threshold.

In another example, the method determines a singulation state map to indicate a range of seed singulation quality (e.g., good, singulation errors (e.g., skip, multiples)) for each row unit for a planting operation. The singulation state can be characterized as a good state if no errors or characterized in an error state if skips or multiples occur during planting.

In one example, the method determines a liquid flow state for each row unit to indicate liquid flow quality for a liquid application. If the liquid flow for a row unit is above/below a threshold (e.g., first percentage (%) above/below a threshold), then an alert state is generated for the row unit. If the liquid flow for a row unit is significantly above/below a threshold (e.g., second % above/below a threshold), then an alarm or failure state is generated for the row unit.

At operation 412, the display device in response to receiving a user input displays the state data for each row unit of an agricultural implement for the at least one parameter that is associated with the agricultural application. The state data can be displayed with an alert and alarm map (e.g., seed population state map, SRI state map, coverage state map, insecticide state map, vehicle/machine speed state map, row speed state map, down force state map, applied down force state map, seeding tank state map, liquid flow state map, granular rate state map, spacing state map for planting seeds, ride quality state map, closing margin state map, closing act, pressure state map, singulation state map with singulation errors (e.g., skip, multiple, good), ride quality state map) for the at least one parameter.

In some embodiments, the operations of the method(s) disclosed herein can be altered, modified, combined, or deleted. The methods in embodiments of the present disclosure may be performed with a device, an apparatus, or data processing system as described herein. The device, apparatus, or data processing system may be a conventional, general-purpose computer system or special purpose computers, which are designed or programmed to perform only one function, may also be used.

FIG. 5 illustrates a monitor or display device having a user interface 501 with a population map and selectable options to select a state for a parameter in accordance with one embodiment. An initiated software application (e.g., field application) of a data processing system generates the user interface 501 that is displayed by the monitor or display device.

The software application can provide different display regions that are selectable by a user. In one example, the display regions include a product application option and then a sub-down menu of options including a population state that is selected in FIG. 5. Each line (e.g., red, orange, yellow, green) represents seed population per unit area (e.g., 38.5 represents 38,500 seeds per acre) per row unit of a planter. In one example, the planter has 48 row units and the user interface 501 shows multiple passes across a field. The black lines indicate a boundary between the passes (e.g., left to right pass, right to left pass).

Figure 6:
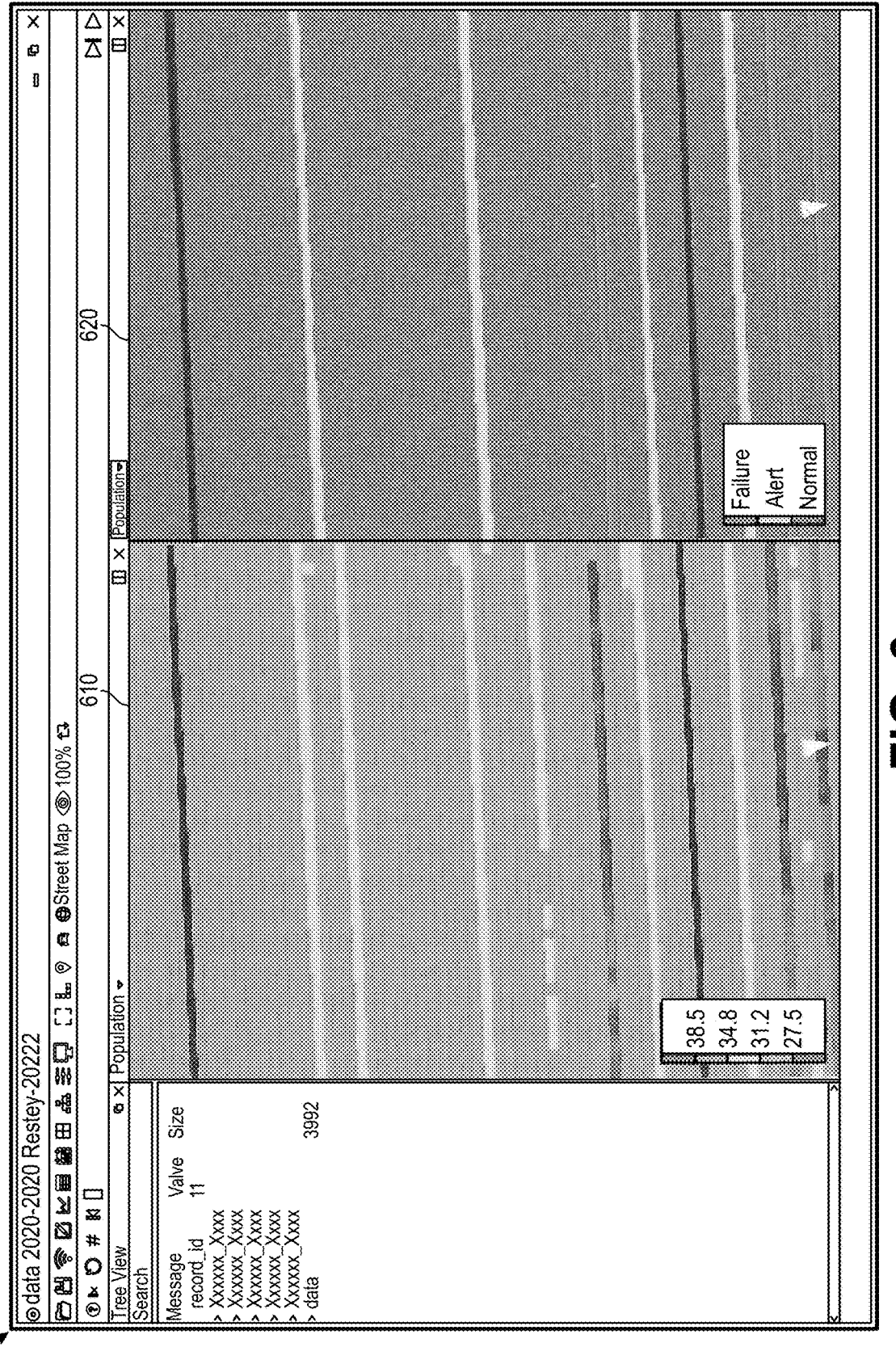
FIG. 6 illustrates a user interface with the population map for a display region 610 of the user interface and population state for a display region 620 of the user interface.

Upon selection of population state from the user interface 501, a user interface 601 of FIG. 6 is generated. This user interface 601 shows the population map for a display region 610 of the user interface and population state for a display region 620 of the user interface. The population state indicates a quality of seed population and the population state is determined based on the seed population data and the default/user configuration settings. Each line (e.g., red, yellow, green) represents a different state (e.g., quality indicator) of the seed population. In one example, a green line represents a normal state for population for a row unit, a yellow line represents an alert state for population for a row unit, and a red line represents a failure or alarm state for population for a row unit.

In one example, if the seed population per unit area for a row unit is above a threshold, then a normal state with a green line is generated for the user interface. If the seed population per unit area for a row unit is below a threshold (e.g., 10-20% below a threshold), then an alert state with a yellow line is generated for the row unit. If the seed population per unit area for a row unit is significantly below a threshold (e.g., at least 20% below a threshold), then an alarm or failure state with a red line is generated for the row unit. The threshold for a state and the different states can have default settings or a user can configure these settings.

Figure 7:
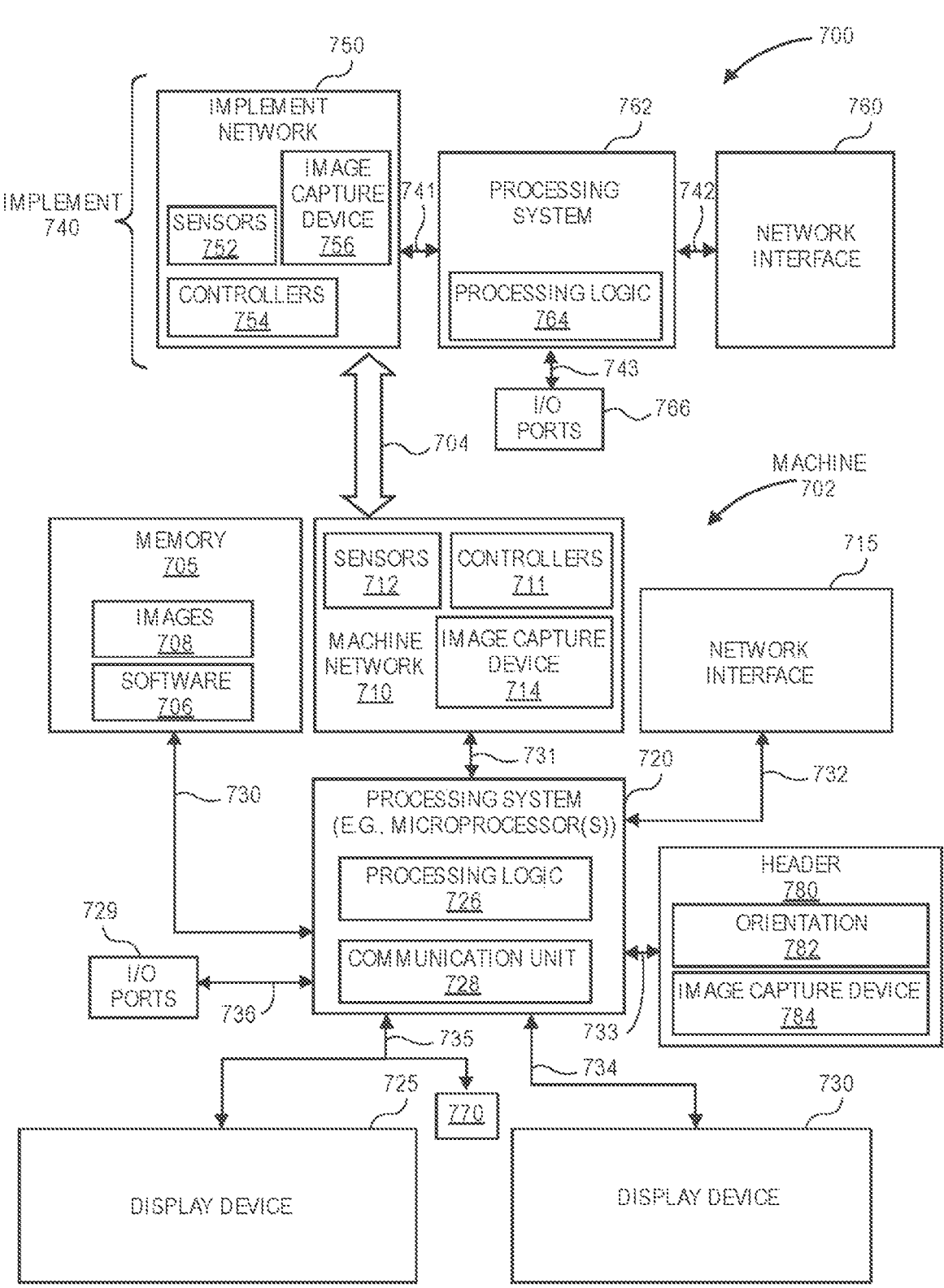
FIG. 7 shows an example of a system 700 that includes a machine 702 (e.g., tractor, combine harvester, etc.) and an implement 740 (e.g., planter, cultivator, plough, sprayer, spreader, irrigation implement, etc.) in accordance with one embodiment.

FIG. 7 shows an example of a system 700 that includes a machine 702 (e.g., tractor, combine harvester, etc.) and an implement 740 (e.g., planter, cultivator, plough, sprayer, spreader, irrigation implement, etc.) in accordance with one embodiment. The machine 702 includes a processing system 720, memory 705, machine network 710 (e.g., a controller area network (CAN) serial bus protocol network, an ISO-BUS network, etc.), and a network interface 715 for communicating with other systems or devices including the implement 740. The machine network 710 includes sensors 712 (e.g., speed sensors), controllers 711 (e.g., GPS receiver, radar unit) for controlling and monitoring operations of the machine, and an optional image capture device 714 for capturing images of crops and soil conditions of a field in accordance with embodiments of the present disclosure. The network interface 715 can include at least one of a GPS transceiver, a WLAN transceiver (e.g., WiFi), an infrared transceiver, a Bluetooth transceiver, Ethernet, or other interfaces from communications with other devices and systems including the implement 740. The network interface 715 may be integrated with the machine network 710 or separate from the machine network 710 as illustrated in FIG. 7. The I/O ports 729 (e.g., diagnostic/on board diagnostic (OBD) port) enable communication with another data processing system or device (e.g., display devices, sensors, etc.).

In one example, the machine performs operations of a combine (combine harvester) for harvesting grain crops. The machine combines reaping, threshing, and winnowing operations in a single harvesting operation. A header 780 (e.g., grain platform, flex platform) includes a cutting mechanism to cause cutting of crops to be positioned into an auger. The header 780 includes an orientation device 782 or mechanism for orienting a crop (e.g., corn, soybeans) for improving image capture with an image capture device 784.

The processing system 720 may include one or more microprocessors, processors, a system on a chip (integrated circuit), or one or more microcontrollers. The processing system includes processing logic 726 for executing software instructions of one or more programs and a communication unit 728 (e.g., transmitter, transceiver) for transmitting and receiving communications from the machine via machine network 710 or network interface 715 or implement via implement network 750 or network interface 760. The communication unit 728 may be integrated with the processing system or separate from the processing system. In one embodiment, the communication unit 728 is in data communication with the machine network 710 and implement network 750 via a diagnostic/OBD port of the I/O ports 729.

Processing logic 726 including one or more processors may process the communications received from the communication unit 728 including agricultural data. The system 700 includes memory 705 for storing data and programs for execution (software 706) by the processing system. The memory 705 can store, for example, software components such as image capture software, software for generating and displaying quality indicator states for agricultural parameters that are associated with agricultural applications for performing operations or methods of the present disclosure, or any other software application or module, images (e.g., captured images of crops), alerts, maps, etc. The memory 705 can be any known form of a machine readable non-transitory storage medium, such as semiconductor memory (e.g., flash; SRAM; DRAM; etc.) or non-volatile memory, such as hard disks or solid-state drive. The system can also include an audio input/output subsystem (not shown) which may include a microphone and a speaker for, for example, receiving and sending voice commands or for user authentication or authorization (e.g., biometrics).

The processing system 720 communicates bi-directionally with memory 705, machine network 710, network interface 715, header 780, display device 730, display device 725, and I/O ports 729 via communication links 730-736, respectively.

Display devices 725 and 730 can provide visual user interfaces for a user or operator. The display devices may include display controllers. In one embodiment, the display device 725 is a portable tablet device or computing device with a touchscreen that displays images (e.g., captured images, localized view map layer, high definition field maps of as-planted or as-harvested data or other agricultural variables or parameters, alert and alarm maps with quality indicator states, yield maps, etc.) and data generated by an agricultural data analysis software application or field view software application and receives input (e.g., expand (positive expansion, negative expansion or contraction), panning) from the user or operator for a displaying quality indicator states for a parameter of a region of a field, monitoring and controlling field operations, or any operations or methods of the present disclosure. The operations may include configuration of the machine or implement, reporting of data, control of the machine or implement including sensors and controllers, and storage of the data generated. The display device 730 may be a display (e.g., display provided by an original equipment manufacturer (OEM)) that displays images and data for a localized view map layer, as-planted or as-harvested data, yield data, controlling a machine (e.g., planter, tractor, combine, sprayer, etc.), steering the machine, and monitoring the machine or an implement (e.g., planter, combine, sprayer, etc.) that is connected to the machine with sensors and controllers located on the machine or implement.

A cab control module 770 may include an additional control module for enabling or disabling certain components or devices of the machine or implement. For example, if the user or operator is not able to control the machine or implement using one or more of the display devices, then the cab control module may include switches to shut down or turn off components or devices of the machine or implement.

The implement 740 (e.g., planter, cultivator, plough, sprayer, spreader, irrigation implement, etc.) includes an implement network 750, a processing system 762, a network interface 760, and optional input/output ports 766 for communicating with other systems or devices including the machine 702. The implement network 750 (e.g., a controller area network (CAN) serial bus protocol network, an ISO-BUS network, etc.) includes an image capture device 756 for capturing images of crop development and soil conditions, sensors 752 (e.g., speed sensors, seed sensors for detecting passage of seed, downforce sensors, actuator valves, OEM sensors, etc.), controllers 754 (e.g., GPS receiver), and the processing system 762 for controlling and monitoring operations of the machine. The OEM sensors may be moisture sensors or flow sensors for a combine, speed sensors for the machine, seed force sensors for a planter, liquid application sensors for a sprayer, or vacuum, lift, lower sensors for an implement. For example, the controllers may include processors in communication with a plurality of seed sensors. The processors are configured to process images captured by image capture device 756 or seed sensor data and transmit processed data to the processing system 762 or 720. The controllers and sensors may be used for monitoring motors and drives on a planter including a variable rate drive system for changing plant populations. The controllers and sensors may also provide swath control to shut off individual rows or sections of the planter. The sensors and controllers may sense changes in an electric motor that controls each row of a planter individually. These sensors and controllers may sense seed delivery speeds in a seed tube for each row of a planter.

The network interface 760 can be a GPS transceiver, a WLAN transceiver (e.g., WiFi), an infrared transceiver, a Bluetooth transceiver, Ethernet, or other interfaces from communications with other devices and systems including the machine 702. The network interface 760 may be integrated with the implement network 750 or separate from the implement network 750 as illustrated in FIG. 7.

The processing system 762 communicates bi-directionally with the implement network 750, network interface 760, and I/O ports 766 via communication links 741-743, respectively.

The implement communicates with the machine via wired and possibly also wireless bi-directional communications 704. The implement network 750 may communicate directly with the machine network 710 or via the network interfaces 715 and 760. The implement may also by physically coupled to the machine for agricultural operations (e.g., planting, harvesting, spraying, etc.).

The memory 705 may be a machine-accessible non-transitory medium on which is stored one or more sets of instructions (e.g., software 706) embodying any one or more of the methodologies or functions described herein. The software 706 may also reside, completely or at least partially, within the memory 705 and/or within the processing system 720 during execution thereof by the system 700, the memory and the processing system also constituting machine-accessible storage media. The software 706 may further be transmitted or received over a network via the network interface device 715.

In one embodiment, a machine-accessible non-transitory medium (e.g., memory 705) contains executable computer program instructions which when executed by a data processing system cause the system to perform operations or methods of the present disclosure. While the machine-accessible non-transitory medium (e.g., memory 705) is shown in an exemplary embodiment to be a single medium, the term "machine-accessible non-transitory medium" should be taken to include a single medium or multiple media (e.g., a centralized or distributed database, and/or associated caches and servers) that store the one or more sets of instructions. The term "machine-accessible non-transitory medium" shall also be taken to include any medium that is capable of storing, encoding or carrying a set of instructions for execution by the machine and that cause the machine to perform any one or more of the methodologies of the present disclosure. The term "machine-accessible non-transitory medium" shall accordingly be taken to include, but not be limited to, solid-state memories, optical and magnetic media, and carrier wave signals.

It is to be understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A computer implemented method comprising:

obtaining as applied data from one or more sensors of an agricultural implement as the agricultural implement passes through a field for an agricultural application;

processing the as applied data to calculate data for a parameter for the agricultural application, wherein the parameter is at least one of (i) seed population, (ii) row unit down force, (iii) row unit applied down force, (iv) closing actuator pressure, (v) granular rate, (vi) liquid rate, (vii) liquid pressure, (viii) vehicle/machine speed, (ix) row unit speed, and (x) ride quality;

determining a quality indicator state for each row unit of the agricultural implement based on the data for the parameter and at least one of default configuration settings or user configuration settings for the quality indicator state, wherein the quality indicator state is at least one of:

(i) seed population per unit area for a row unit is below a seed population threshold for the seed population parameter, (ii) row unit down force is above or below a row unit down force threshold for the row unit down force parameter, (iii) row unit applied down force is above or below a row unit applied down force threshold, (iv) closing actuator pressure is above or below a closing actuator threshold, (v) granular rate is above or below a granular rate threshold, (vi) liquid rate is above or below a liquid rate threshold, (vii) liquid pressure is above or below a liquid pressure threshold, (viii) vehicle/machine speed is above or below a vehicle/machine threshold, (ix) row unit speed is above or below a row unit speed threshold, and (x) ride quality is above a ride quality threshold;

displaying on a display device a state map of the quality indicator state of the parameter with the quality indicator state including a normal state for the parameter, an alert state for the parameter, and an alarm or failure state for the parameter; and actuating an actuator, wherein actuating the actuator is at least one of:

(i) increasing a speed of a seed meter until the seed population per unit area for the row unit is equal to the seed population threshold for the seed population parameter, (ii) increasing or decreasing a row unit down force actuator until the row unit down force is equal to the row unit down force threshold for the row unit down force parameter, (iii) increasing or decreasing a row unit down force actuator until the row unit applied down force is equal to the row unit applied down force threshold for the row unit applied down force parameter, (iv) increasing or decreasing the closing actuator pressure until the closing actuator pressure is equal to the closing actuator threshold, (v) increasing or decreasing a rate of a granular meter until the granular rate is equal to the granular rate threshold, (vi) increasing or decreasing a pump rate until the liquid rate is equal to the liquid rate threshold, (vii) increasing or decreasing the liquid pressure until the liquid pressure is equal to the liquid pressure threshold, (viii) increasing or decreasing vehicle/machine speed until the vehicle/machine speed is equal to the vehicle/machine threshold, (ix) increasing or decreasing vehicle/machine speed until the row unit speed is equal to the row unit speed threshold, and (x) decreasing vehicle/machine speed until the ride quality is equal to the ride quality threshold.

2. The computer implemented method of claim 1, wherein the parameter comprises seed population, and the quality indicator state comprises the seed population per unit area for the row unit being below the seed population threshold for the seed population parameter wherein the alert state for the seed population is a first number of seeds below the seed population threshold or a first percentage (%) below the seed population threshold; and wherein the alarm or failure state for the seed population is below the seed population threshold by a second number of seeds below the seed population threshold or second % below the seed population threshold, wherein the second number and the second % are greater than the first number and first %, respectively.

3. The computer implemented method of claim 2, wherein the default configuration settings or the user configuration settings determine the first and second number of seeds and also determine the first and second percentages below the threshold.

4. A computing device comprising:

a display device for displaying a user interface having a field region for a parameter; and at least one processor coupled to the display device, the at least one processor is configured to receive as applied data from one or more sensors of an agricultural implement as the agricultural implement passes through a field for an agricultural application, to process the as applied data to calculate data for the agricultural parameter for the agricultural application, wherein the parameter is at least one of:

(i) seed population, (ii) ow unit down force, (iii) row unit applied down force, (iv) closing actuator pressure, (v) granular rate, (vi) liquid rate, (vii) liquid pressure, (viii) vehicle/machine speed, (ix) row unit speed, and (x) ride quality;

and to determine a quality indicator state for each row unit of the agricultural implement based on the data for the agricultural parameter and at least one of default configuration settings or user configuration settings for the quality indicator state, wherein the quality indicator state is at least one of:

(i) seed population per unit area for a row unit is below a seed population threshold for the seed population parameter, (ii) row unit down force is above or below a row unit down force threshold for the row unit down force parameter, (iii) row unit applied down force is above or below a row unit applied down force threshold, (iv) closing actuator pressure is above or below a closing actuator threshold, (v) granular rate is above or below a granular rate threshold, (vi) liquid rate is above or below a liquid rate threshold, (vii) liquid pressure is above or below a liquid pressure threshold, (viii) vehicle/machine speed is above or below a vehicle/machine threshold, (ix) row unit speed is above or below a row unit speed threshold, and (x) ride quality is above a ride quality threshold; and to display a state map for the quality indicator state of the agricultural parameter with the quality indicator state including a normal state for the agricultural parameter, an alert state for the agricultural parameter, and an alarm or failure state for the agricultural parameter; and an actuator, wherein the actuator is at least one of:

(i) a seed meter actuator for increasing a speed of a seed meter until the seed population per unit area for the row unit is equal to the seed population threshold for the seed population parameter, (ii) a row unit down force actuator configured to at least one of: (a) increase or decrease the row unit down force until the row unit down force is equal to the row unit down force threshold for the row unit down force parameter, and (b) increase or decrease the row unit down force until the row unit applied down force is equal to the row unit applied down force threshold for the row unit applied down force parameter, (iii) a closing actuator configured to increase or decrease the closing actuator pressure until the closing actuator pressure is equal to the closing actuator threshold, (iv) a granular meter controller configured to increase or decrease a rate of a granular meter until the granular rate is equal to the granular rate threshold, (v) a pump configured to increase or decrease a pump rate until the liquid rate is equal to the liquid rate threshold, (vi) a pressure controller configured to increase or decrease the liquid pressure until the liquid pressure is equal to the liquid pressure threshold, (vii) a vehicle/machine throttle that is configured to at least one of (a) increase or decrease vehicle/machine speed until the vehicle/machine speed is equal to the vehicle/machine threshold, (b) increase or decrease vehicle/machine speed until the row unit speed is equal to the row unit speed threshold, and (c) decrease vehicle/machine speed until the ride quality is equal to the ride quality threshold.

5. The computing device of claim 4, wherein the parameter comprises seed population, wherein the quality indicator state comprises seed population per unit area for the row unit is below the seed population threshold; the alert state for seed population is a first number of seeds below the seed population threshold or a first percentage (%) below the seed population threshold; and the alarm or failure state for seed population per unit area is below the threshold by a second number of seeds below the threshold or second % below the threshold, wherein the second number and the second % are greater than the first number and first %, respectively.

6. The computing device of claim 4, wherein the agricultural implement is one of a planter, a tillage implement, or a fertilizer implement.

7. The computing device of claim 4, wherein the agricultural implement is a planter.

8. The computer implemented method of claim 1, wherein the agricultural implement is one of a planter, a tillage implement, or a fertilizer implement.

9. The computer implemented method of claim 1, wherein the agricultural implement is a planter.

* * * * *